US009522696B2

(12) United States Patent
Hong

(10) Patent No.: US 9,522,696 B2
(45) Date of Patent: Dec. 20, 2016

(54) METHOD AND APPARATUS FOR CONTROLLING ELECTRIC POWER STEERING

(71) Applicant: MANDO CORPORATION, Pyeongtaek-si, Gyeonggi-do (KR)

(72) Inventor: Seung Gyu Hong, Bucheon-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/882,348

(22) Filed: Oct. 13, 2015

(65) Prior Publication Data

US 2016/0101809 A1 Apr. 14, 2016

(30) Foreign Application Priority Data

Oct. 13, 2014 (KR) .................. 10-2014-0137301

(51) Int. Cl.
*B62D 5/00* (2006.01)
*B62D 5/04* (2006.01)
*B62D 6/00* (2006.01)

(52) U.S. Cl.
CPC .......... *B62D 5/0484* (2013.01); *B62D 5/049* (2013.01); *B62D 5/0463* (2013.01)

(58) Field of Classification Search
CPC combination set(s) only.
See application file for complete search history.

(56) References Cited

U.S. PATENT DOCUMENTS

| 4,886,136 | A | * | 12/1989 | Kozuka | ................. | B62D 5/049 180/404 |
| 6,013,994 | A | * | 1/2000 | Endo | .................... | B62D 5/0463 318/430 |
| 6,326,753 | B1 | * | 12/2001 | Someya | ............... | B62D 5/0463 180/443 |
| 6,442,462 | B1 | * | 8/2002 | Nishizaki | ............... | B62D 5/006 180/402 |

(Continued)

FOREIGN PATENT DOCUMENTS

JP 2009006985 A 1/2009

OTHER PUBLICATIONS

Korean Office Action dated Jan. 4, 2016 in connection with the counterpart Korean Patent Application No. 10-2014-0137301.

*Primary Examiner* — Yonel Beaulieu
(74) *Attorney, Agent, or Firm* — Hauptman Ham, LLP

(57) ABSTRACT

The present invention relates to a method and apparatus for controlling electric power steering. In particular, the present invention provides a power steering control method that includes: a breakdown detection step of detecting whether a torque sensor has broken down; an information reception step of receiving steering angle information and vehicle speed information in the case in which the torque sensor has broken down; a compensation target value calculation step of calculating a self-aligning torque, and a damping force, an inertial force, and a frictional force of an electric power steering apparatus by using one or more of the steering angle information and the vehicle speed information; and a current control step of calculating a steering assist force based on the compensation target value and controlling the supply of a motor control current that corresponds to the steering assist force, and an apparatus for the same.

14 Claims, 12 Drawing Sheets

(56) References Cited

U.S. PATENT DOCUMENTS

| | | | | |
|---|---|---|---|---|
| 6,658,333 B2 * | 12/2003 | Kawada | ................. | B62D 5/049 180/443 |
| 6,874,594 B2 * | 4/2005 | Itakura | ................. | B62D 5/0481 180/446 |
| 6,938,121 B2 * | 8/2005 | Shigetomi | ............. | G06F 3/0607 369/14 |
| 8,731,775 B2 * | 5/2014 | Kobayashi | ........... | B62D 5/0466 180/443 |
| 2002/0120378 A1 * | 8/2002 | Kawada | ................. | B62D 5/049 701/41 |
| 2006/0022626 A1 * | 2/2006 | Kobayashi | ............. | B62D 5/046 318/432 |
| 2008/0156572 A1 * | 7/2008 | Kasahara | ............... | B62D 5/003 180/402 |

* cited by examiner

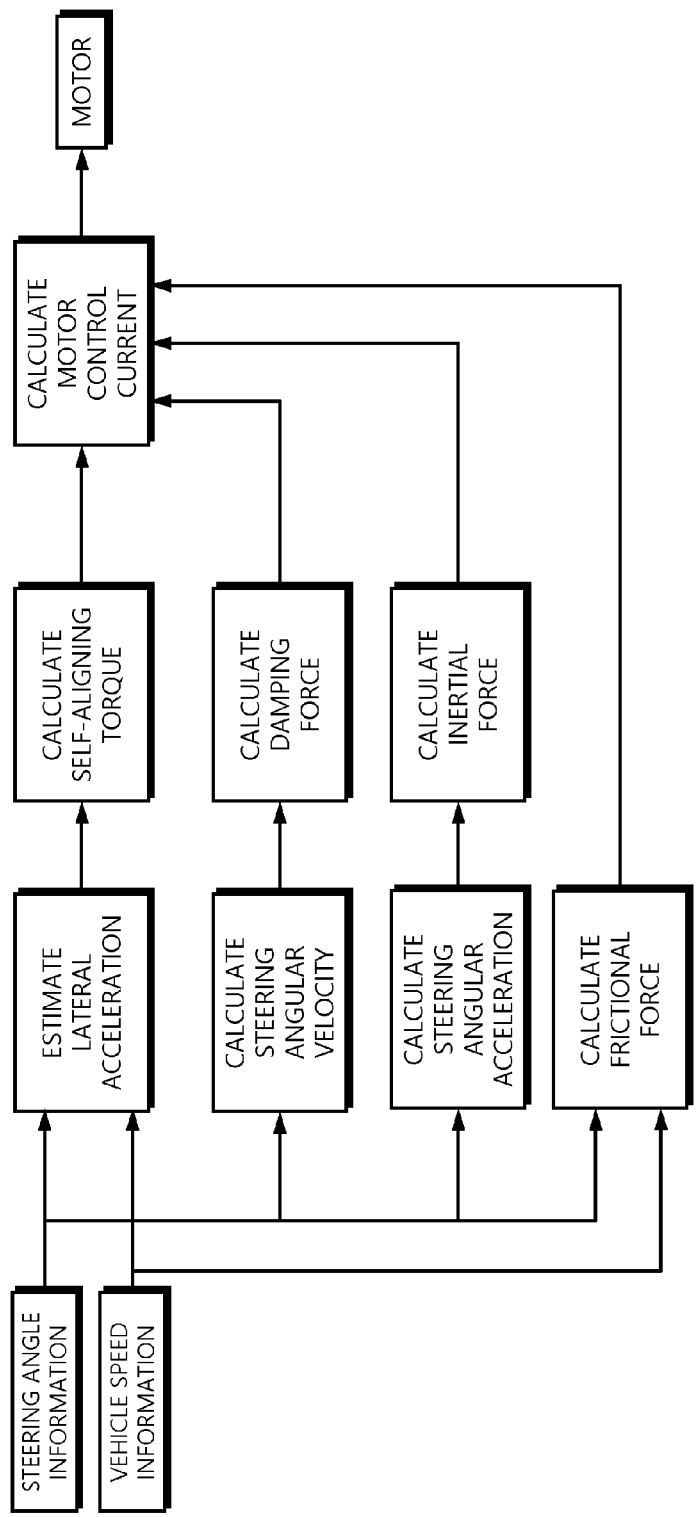

METHOD AND APPARATUS FOR CONTROLLING ELECTRIC POWER STEERING

CROSS-REFERENCE TO RELATED APPLICATION

This application claims priority from and the benefit under 35 U.S.C. §119(a) of Korean Patent Application No, 10-2014-0137301, filed on Oct. 13, 2014, which is hereby incorporated by reference for all purposes as if fully set forth herein.

BACKGROUND OF THE INVENTION

1. Field of the Invention

The present invention relates to a method and apparatus for controlling electric power steering. More specifically, the present invention relates to a power steering control method and an apparatus for the same that can continually provide a steering assist force by using a motor in an electric power steering control apparatus even in cases where a torque sensor has broken down.

2. Description of the Prior Art

An electric power steering control method refers to a power steering control method that uses a steering assist force generator (for example, a motor) for assisting for a driver's steering force. For example, the electric power steering control method refers to a system that measures a driver's steering torque, calculates a steering assist force that corresponds to the steering torque, and provides the steering assist force by using a motor when the driver operates a steering wheel.

Such an electric power steering control method helps the driver perform the steering operation with little force, and provides various steering assist forces according to vehicle speeds to prevent an accident that may be caused by abrupt steering while driving at a high speed.

Accordingly, it is important to accurately measure a driver's steering torque in order to accurately control the power steering.

However, in cases where the reliability of a torque signal output from a torque sensor, which measures a driver's steering torque, is not ensured due to a breakdown in the torque sensor, power steering may be erroneously controlled, or power steering control itself may not be performed, which results in a serious traffic accident.

Despite these problems, the power steering control method in the related art abruptly stops supplying a steering assist force in the situation where a torque sensor has broken down, thereby causing a sense of difference in power steering and a failure to provide adequate time for the driver to counteract the breakdown. Further, in the case of the torque sensor breakdown, the power steering control method in the related art merely stops supplying the steering assist force and fails to propose a method for continually providing the steering assist force.

SUMMARY OF THE INVENTION

The present invention, which has been conceived to solve such problems in the art, provides a method and apparatus for controlling power steering that can continually provide a steering assist force by using steering angle information and vehicle speed information in case in which the torque sensor has broken down.

In addition, the present invention provides a method and apparatus for calculating a compensation target value required to provide a steering assist force without information from a torque sensor.

In accordance with one aspect of the present invention, a method for controlling power steering includes: a breakdown detection step of detecting whether a torque sensor has broken down; an information reception step of receiving steering angle information and vehicle speed information in the case of a breakdown in the torque sensor; a compensation target value calculation step of calculating a self-aligning torque, and a damping force, an inertial force, and a frictional force of an electric power steering apparatus by using one or more of the steering angle information and the vehicle speed information; and a current control step of calculating a steering assist force based on the compensation target value and controlling the supply of a motor control current that corresponds to the steering assist force.

In accordance with another aspect of the present invention, an apparatus for controlling power steering includes: a breakdown detection unit that detects whether a torque sensor has broken down; an information reception unit that receives steering angle information and vehicle speed information in the case of a breakdown in the torque sensor; a compensation target value calculation unit that calculates a self-aligning torque, and a damping force, an inertial force, and a frictional force of an electric power steering apparatus by using one or more of the steering angle information and the vehicle speed information; and a current controller that calculates a steering assist force based on the compensation target value and controls the supply of a motor control current that corresponds to the steering assist force.

As described above, the present invention provides the method and apparatus for controlling power steering that can continually provide a steering assist force by using steering angle information and vehicle speed information in the case of a breakdown in a torque sensor.

In addition, the present invention provides the method and apparatus that can calculate a compensation target value required to provide a steering assist force without information from a torque sensor.

BRIEF DESCRIPTION OF THE DRAWINGS

The above and other objects, features, and advantages of the present invention will be more apparent from the following detailed description taken in conjunction with the accompanying drawings, in which:

FIG. 5 is a schematic block diagram illustrating an operation of calculating a compensation target value according to an embodiment of the present invention;

DETAILED DESCRIPTION OF THE EXEMPLARY EMBODIMENTS

Disclosed are a power steering control method and a power steering control apparatus.

Hereinafter, embodiments of the present invention will be described with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
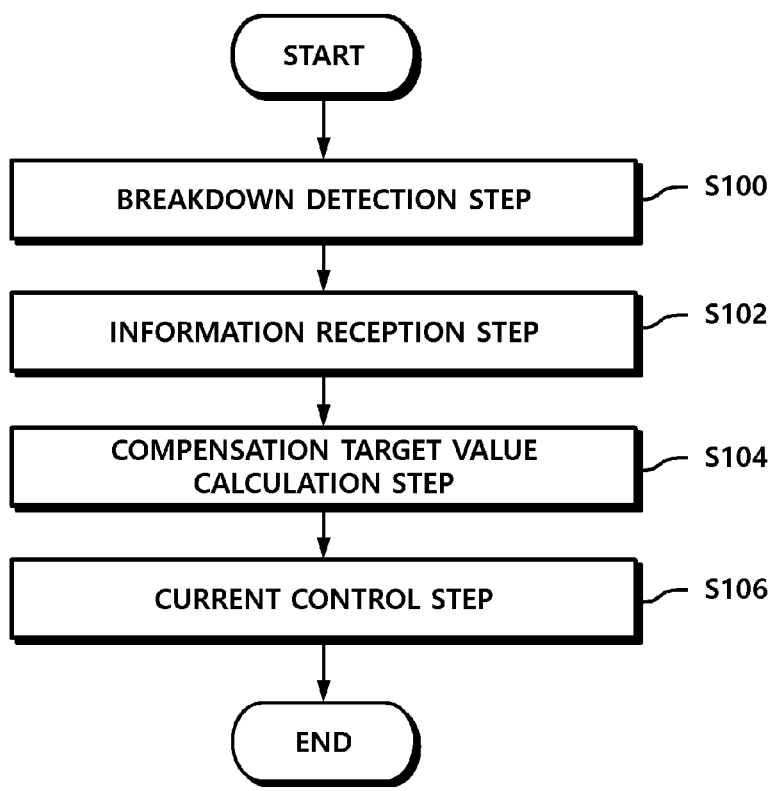
FIG. 1 is a flowchart illustrating a power steering control method according to an embodiment of the present invention.

FIG. 1 is a flowchart illustrating a power steering control method according to an embodiment of the present invention.

The power steering control method, according to the embodiment of the present invention, may include: a breakdown detection step of detecting whether a torque sensor has broken down; an information reception step of receiving steering angle information and vehicle speed information in the case of a torque sensor breakdown; a compensation target value calculation step of calculating a self-aligning torque, and a damping force, an inertial force, and a frictional force of an electric power steering apparatus by using one or more of the steering angle information and the vehicle speed information; and a current control step of calculating a steering assist force based on the compensation target value and controlling the supply of a motor control current that corresponds to the steering assist force.

Referring to FIG. 1, the power steering control method of the present invention may include the breakdown detection step (S100) of detecting whether a torque sensor has broken down. The torque sensor detects a steering torque acting on a steering wheel and outputs a steering torque signal that corresponds to the steering torque. For example, the steering torque sensor may output a steering torque signal that corresponds to the twisting of a torsion bar that is twisted by a driver's steering wheel operation. An electric power steering control system, which provides a steering assist force by using the steering torque according to the driver's steering wheel operation, may control to allow a large force to be applied to operate the steering wheel during high-speed driving and to allow a small force to be applied to operate the steering wheel during low-speed driving or during a stop in conjunction with vehicle speed information, etc. In this way, the driver may ensure the convenience and safety of the steering wheel operation.

In order to use the electric power steering control system, it is important to measure the driver's steering torque, and the torque sensor may measure the driver's steering torque. However, in the case of a breakdown in the torque sensor, the electric power steering control system may incorrectly provide a steering assist force so that the driver cannot perform an accurate steering operation. Accordingly, in the power steering control method of the present invention, whether the torque sensor has broken down may be detected in order to provide an accurate steering assist force even in the case of a breakdown in the torque sensor.

For example, the determination as to whether a torque sensor has broken down may be made through a comparative analysis of steering torque signals of one or more torque sensors. That is, in cases where there are two torque sensors, if the difference between steering torque signals received from the two torque sensors exceeds a preset threshold value, it may be determined that at least one of the torque sensors has broken down. Alternatively, in cases where the driver recognizes an abnormality, and a breakdown signal is received through a breakdown button, etc., it may be determined that a torque sensor has broken down. In another case, whether a torque sensor has broken down may be detected by using a breakdown signal that is generated by breakdown detection logic thereof when the torque sensor breaks down. In addition, whether a torque sensor is operating normally may be detected by various other methods, and the present invention is not limited to the aforementioned exemplary operations.

Meanwhile, the power steering control method of the present invention may include the information reception step (S102) of receiving steering angle information and vehicle speed information in the case in which the torque sensor has broken down. For example, in the information reception step, when it is determined that the torque sensor has broken down, steering angle information may be received from a steering angle sensor or a motor position sensor, and vehicle speed information may be received from a vehicle speed sensor. The steering angle sensor may generate a steering angle signal that includes information on a steering angle of the steering wheel, and the motor position sensor may calculate and provide the driver's steering angle information by using one or more pieces of information among an absolute angle and a relative angle of the steering assist motor. Specifically, for example, first, a motor drive unit may determine the angular velocity of a motor by using a circular magnet, which is equally divided into "N pole-S pole-N pole-S pole" in a serial order and is fixed around a rotating shaft of the motor, and a hall sensing unit that has 12 hall sensors installed therein at an equal interval and is disposed around the consecutive "N pole-S pole" among the "N pole-S pole-N pole-S pole." By way of example, the 12 hall sensors generate 48 pulses while the motor makes one revolution, and the motor drive unit may calculate a steering angle by determining the rotational position of the motor through a combination of the 48 pulses. Further, a steering angular velocity may be obtained by the time derivative of the steering angle. Each of the hall sensors generates a high level signal or a low level signal when an N or S pole closely approaches.

Meanwhile, the vehicle speed sensor detects the vehicle speed and outputs vehicle speed information that corresponds to the vehicle speed. For example, the vehicle speed sensor may output vehicle speed information for a current vehicle speed by periodically counting wheel pulses that are generated according to the rotation of a vehicle wheel.

The power steering control method of the present invention may include the compensation target value calculation step (S104) of calculating a self-aligning torque, and a damping force, an inertial force, and a frictional force of the electric power steering apparatus by using one or more of the steering angle information and the vehicle speed information. For example, in the compensation target value calculation step, the self-aligning torque, the damping force, the inertial force, and the frictional force, which may be used to calculate a steering assist force required to assist with the driver's steering force, may be calculated by processing the steering angle information and the vehicle speed information. The self-aligning torque, also referred to as a restoring torque, means a force that acts in a direction that reduces the slip angle around a contact center because the point of action of a cornering force does not agree with the contact center point of a tire when the tire turns with the slip angle. The self-aligning torque may act as an external force when the driver operates the steering wheel to make the vehicle turn. Accordingly, in order to compensate for the steering force according to the driver's steering wheel operation, it is necessary to calculate the self-aligning torque and to provide a steering assist force that corresponds to the relevant torque. Further, the damping force of the electric power steering apparatus may refer to a force that offsets the vibration that may occur according to the rotation of the motor included in the electric power steering apparatus. That is, a damping current is required for the damping of the electric power steering system, and to achieve this, a damping current may be calculated by using steering angular velocity information. Accordingly, the damping force for the calculation of the damping current may be calculated in the power steering control method of the present invention. In this specification, the damping force for the calculation of the damping current of the electric power steering apparatus or system may include a vibration force, and may also refer to a force required to reduce the vibration. The frictional force may refer to a frictional force that occurs when the driver operates the steering wheel. When the driver operates the steering wheel, a predetermined amount of frictional force may be generated by the steering wheel in a stationary state in the opposite direction to the driver's operation. In the compensation target value calculation step, a frictional force for this may be calculated.

Meanwhile, the power steering control method of the present invention may further include the current control step (S106) of calculating a steering assist force based on the compensation target value and controlling the supply of a motor control current that corresponds to the steering assist force. In the current control step, a motor control current for driving the motor included in the electric power steering system may be calculated and supplied to the motor. Alternatively, in the current control step, a control may be performed to calculate a motor control current and supply the corresponding motor control current according to the driver's steering wheel operation.

Hereinafter, the respective steps of the power steering control method of the present invention, described above with reference to FIG. 1, will be specifically described with reference to the accompanying drawings.

Figure 2:
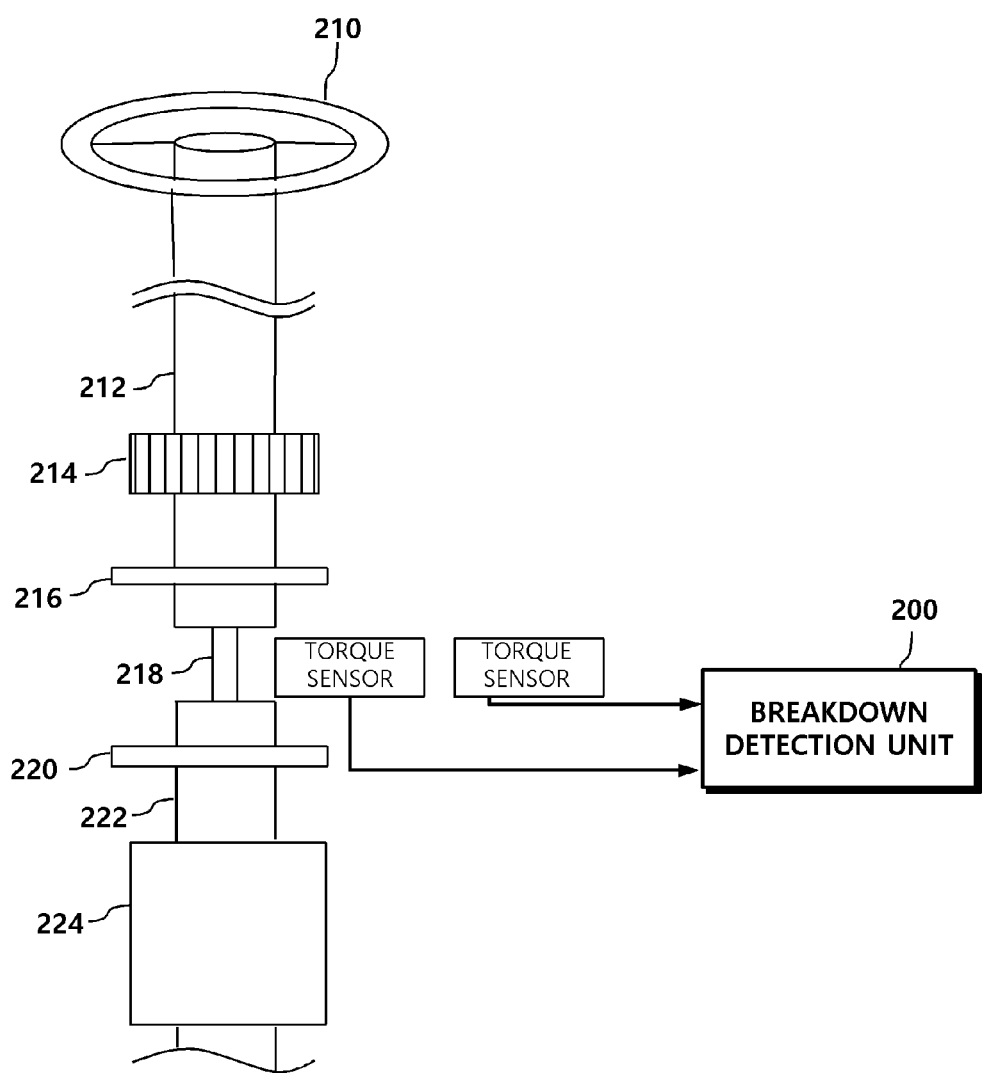
FIG. 2 is a view for explaining an operation of detecting a breakdown in a torque sensor of the present invention.

FIG. 2 is a view for explaining an operation of detecting a breakdown in a torque sensor of the present invention.

Referring to FIG. 2, an electric power steering apparatus, according to an embodiment of the present invention, may include a steering wheel 210, an input shaft 212, a sensing gear 214 for detecting rotation information, an input rotor angle 216, a torsion bar 218, an output rotor angle 220, an output shaft 222, a motor 224, etc.

Further, the electric power steering apparatus of the present invention may include one or more torque sensors that measure a driver's steering torque by measuring the twisting of the torsion bar 218. That is, when the driver operates the steering wheel 210, the torsion bar 218 is twisted while the input shaft physically connected to the steering wheel 210 rotates, and the torque sensors may calculate the driver's steering torque acting on the steering wheel 210 by measuring the degree of the twisting.

Accordingly, in the breakdown detection step, according to the embodiment of the present invention, a breakdown in the torque sensors may be detected by checking whether there is an abnormality in the steering torque signals received from the one or more torque sensors. For example, a breakdown detection unit 200 may receive signals from the torque sensors to detect whether the torque sensors have broken down. Whether the torque sensors have broken down may be detected by comparing the signals received from the plurality of torque sensors, or by receiving breakdown signals according to the breakdown detection logic of the torque sensors.

As described above, the torque sensors may be embodied as a single torque angle sensor, or may be embodied as torque sensors that perform only the functions thereof.

Figure 3:
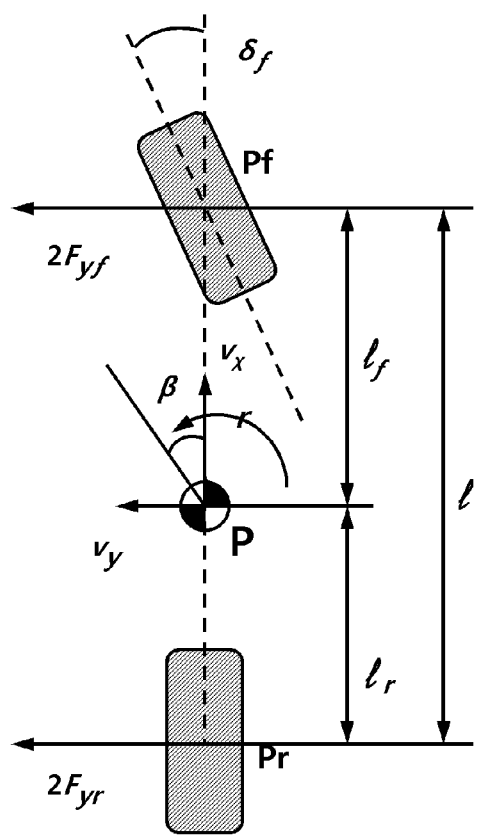
FIG. 3 is a view for explaining an operation of calculating lateral acceleration information according to an embodiment of the present invention.

FIG. 3 is a view for explaining an operation of calculating lateral acceleration information according to an embodiment of the present invention.

In a compensation target value calculation step, according to another embodiment of the present invention, a self-aligning torque, and a damping force, an inertial force, and a frictional force of an electric power steering apparatus may be calculated by using one or more of steering angle information and vehicle speed information. The steering angle information may be received from a steering angle sensor or a motor position sensor, and the vehicle speed information may be received from a vehicle speed sensor.

In a steering power control method of the present invention, it is necessary to calculate a force that has an effect on a driver's steering operation in order to calculate a compensation target value. For example, when the driver performs a steering operation, a self-aligning torque that is a force by which a tire is aligned, a damping force of a steering system, an inertial force of a steering wheel, a frictional force that may be generated according to a movement of the steering wheel may affect the steering operation. Accordingly, in the power steering control method of the present invention, it is possible to supply a steering assist force according to a motor control current by calculating a compensation value through the calculation of the aforementioned force that affects the steering operation even when a torque sensor has broken down. In this way, the driver may perform the steering operation with the continual aid of the electric power steering system. Hereinafter, specific operations and methods for calculating the respective forces will be sequentially described with reference to the respective drawings.

Referring to FIG. 3, in the compensation target value calculation step of the present invention, lateral acceleration may be calculated based on steering angle information, vehicle speed information, and preset vehicle characteristic information, and a self-aligning torque may be calculated based on the calculated later acceleration information. The vehicle characteristic information may be a value set in advance as unique information of the vehicle. For example, the vehicle characteristic information may include one or more of vehicle wheelbase information, Under Steer Gradient constant information, information on the acceleration of gravity, and information on a gear ratio between a steering wheel and a tire.

In the compensation target value calculation step, the self-aligning torque is calculated in order to calculate a steering assist force. For example, the self-aligning torque is dependent on a slip angle of the vehicle, and the slip angle is dependent on the lateral acceleration. Accordingly, the self-aligning torque may be calculated by calculating the lateral acceleration information of the vehicle. Therefore, it is necessary to calculate the lateral acceleration information in the compensation target value calculation step. The lateral acceleration information may be calculated by the steering angle information, the vehicle speed information, and the vehicle characteristic information.

A process of calculating lateral acceleration information by using a bicycle model simplified as illustrated in FIG. 3 will be described.

For example, in the simplified bicycle model, which is generally used, $\delta_f$ denotes a steering angle ($\delta$) or an angle that corresponds to the steering angle ($\delta$) (an angle associated with a turning angle), $P_f$ denotes the center of a front wheel, $P_r$ denotes the center of a rear wheel, $l_f$ denotes the distance between the center ($P_f$) of the front wheel and the center ($P_r$) of the rear wheel, and P denotes a specific point on a line connecting $P_f$ and $P_r$. Further, $l_f$ denotes the distance component from the center ($P_f$) of the front wheel to the point P, and $l_r$ denotes the distance component from the center ($P_r$) of the rear wheel to the point P.

In FIG. 3, when the X-axis direction (the direction of the line connecting $P_f$ and $P_r$) is the front-side direction of the vehicle, and the Y-axis direction (the perpendicular direction to the line connecting $P_f$ and $P_r$) is the lateral direction of the vehicle, $v_x$ denotes the X-axis speed component, and $v_y$ denotes the Y-axis speed component. Accordingly, the speed (V) of the vehicle may be obtained by the vector sum of $v_x$ and $v_y$.

Further, the β component is an angle that corresponds to a turning angle in an over-steering state on the basis of the X-axis, and γ is an element that corresponds to a yaw rate with the point P as the central axis thereof in the over-steering state of the vehicle. $2F_{yf}$ denotes a force acting on the front wheel in the Y-axis direction, and $2F_{yr}$ denotes a force acting on the rear wheel in the Y-axis direction.

For example, lateral acceleration for a vehicle speed and a steering input may be estimated by Equation 1 below.

$$\frac{a_y}{\delta} = \frac{\frac{V^2}{57.3Lg}}{1 + \frac{KV^2}{57.3Lg}} (deg/\text{sec}) \qquad [\text{Equation 1}]$$

$a_y$: Lateral acceleration
$\delta$: Steering angle
V: Vehicle speed
L: Wheelbase
K: Under Steer Gradient (Constant)
g: Acceleration of gravity More specifically, the lateral acceleration ($a_y$) of a vehicle may be calculated by Equation 1 based on the vehicle speed (V) information obtained from a speed measurement sensor or device of the vehicle and the steering angle ($\delta$) information obtained from a steering angle measurement sensor or device while information on the wheelbase (L), the Under Steer Gradient constant (K), and the acceleration of gravity (g), which are constants, are known.

As described above, in the compensation target value calculation step, the lateral acceleration information of the vehicle may be calculated and estimated based on the steering angle information, the vehicle speed information, and the vehicle characteristic information. In another example, the lateral acceleration information may also be calculated by a lateral acceleration signal received through a lateral acceleration sensor.

Meanwhile, in the compensation target value calculation step, a self-aligning torque may be calculated by using the lateral acceleration information. The self-aligning torque may be calculated by using a relation between the lateral acceleration information and the slip angle and a relation between the slip angle and the self-aligning torque, which will be described below with reference to FIG. 4.

Figure 4A:
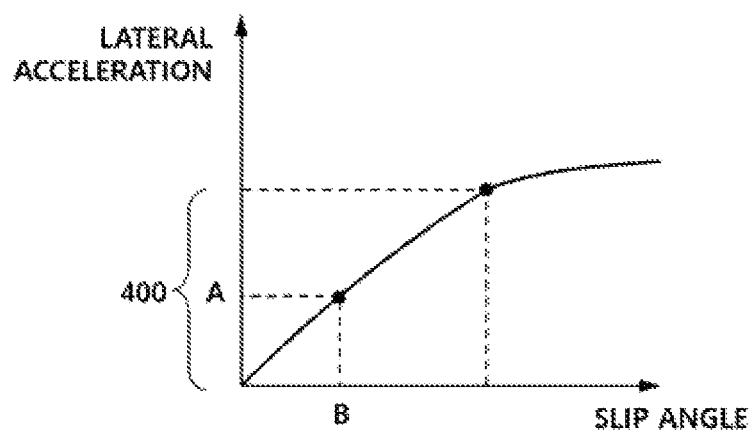
FIGS. 4A and 4B are graphs for explaining an operation of estimating a self-aligning torque from lateral acceleration information according to an embodiment of the present invention.
Figure 4B:
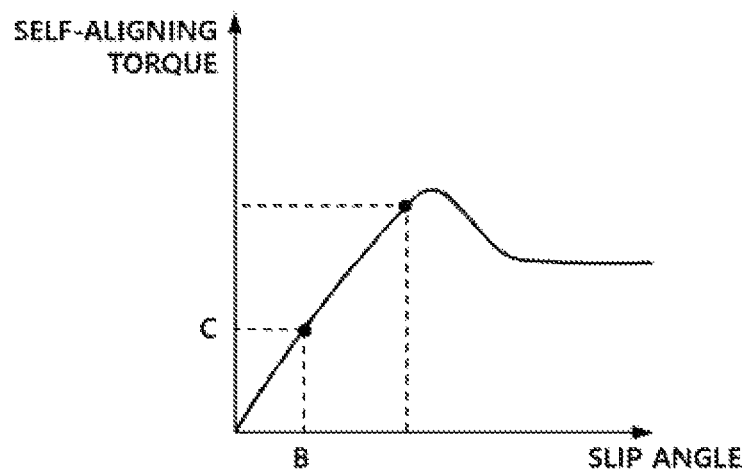

FIGS. 4A and 4B are graphs for explaining an operation of estimating a self-aligning torque from lateral acceleration information according to an embodiment of the present invention.

In a compensation target value calculation step, according to yet another embodiment of the present invention, slip angle information that corresponds to lateral acceleration information may be identified, and the self-aligning torque that corresponds to the slip angle information may be calculated.

Referring to FIG. 4A, lateral accelerations may have a relationship with slip angles as depicted in the graph of FIG. 4A. Further, self-aligning torques may have a relationship with the slip angles as depicted in the graph of FIG. 4B. The graphs of FIGS. 4A and 4B may be obtained from experiments and may be pre-stored values. Accordingly, in the compensation target value calculation step, if the aforementioned lateral acceleration is estimated, the slip angle associated with the corresponding later acceleration may be calculated. In this case, the relationship of FIG. 4A is used. When the slip angle is calculated, the self-aligning torque that corresponds to the slip angle may be calculated in the compensation target value calculation step. In this case, the relationship of FIG. 4B may be used.

However, since the respective values do not linearly correspond to each other as depicted in FIGS. 4A and 4B, a self-aligning torque may be calculated in the compensation target value calculation step only when it is determined that lateral acceleration information is within a preset linear interval. That is, a self-aligning torque may be calculated only when the lateral acceleration information that corresponds to the interval 400 is calculated.

In the aforementioned process of calculating a self-aligning torque, for example, when a lateral acceleration value calculated based on steering angle information, vehicle speed information, and vehicle characteristic information is A, a slip angle B that corresponds to the value A may be calculated. Further, a self-aligning torque C that corresponds to the slip angle B may be calculated by using the graph of FIG. 4B. Accordingly, in the compensation target value calculation step, a restoration control current value for compensating for the self-aligning torque may be calculated after the calculation of the self-aligning torque C.

FIG. 5 is a schematic block diagram illustrating an operation of calculating a compensation target value according to an embodiment of the present invention.

Referring to FIG. 5, in the compensation target value calculation step of the present invention, a self-aligning torque, a damping force, an inertial force, and a frictional force are calculated by using steering angle information and vehicle speed information. Further, in the current control step, a motor control current may be calculated to control a motor, by using the self-aligning torque, the damping force, the inertial force, and the frictional force, which are calculated.

More specifically, lateral acceleration may be estimated by using steering angle information and vehicle speed information. The lateral acceleration may be estimated by using Equation 1 above. After the estimation of the lateral acceleration information, a self-aligning torque is calculated through the method described above with reference to FIGS. 4A and 4B. Accordingly, a restoration control current value may be calculated based on the self-aligning torque.

Meanwhile, in the power steering control method, steering angular velocity information may be calculated by using the steering angle information. The steering angular velocity information may be obtained by the time derivative of the steering angle information. The damping force is changed depending on the steering angular velocity and may be calculated by multiplying the steering angular velocity information by a preset gain. Accordingly, a damping control current may be calculated according to the damping force.

Further, in the power steering control method, steering angular acceleration information may be calculated by using the steering angle information. The steering angular acceleration information may be obtained by the second time derivative of the steering angle information. An inertial force is changed depending on the steering angular acceleration and may be calculated by multiplying the steering angular acceleration information by a preset gain. Accordingly, an inertia control current value that corresponds to the inertial force may be calculated.

The frictional force may be calculated depending on the steering angle information and the vehicle speed information. Information on the direction in which the frictional force is generated may be calculated by using the steering angle information, and the magnitude of the frictional force may be calculated according to the vehicle speed information. Accordingly, a friction control current that corresponds to the frictional force may be calculated. That is, in the compensation target value calculation step, the restoration control current, the damping control current, the inertia control current, and the friction control current may be calculated based on the respective compensation target values, and in the current control step, the steering assist force may be calculated by using the restoration control current, the damping control current, the inertia control current, and the friction control current, which are calculated. Alternatively, in the current control step, a motor control current may be calculated by using the sum of the restoration control current, the damping control current, the inertia control current, and the friction control current. In another example, in the current control step, a motor control current may also be calculated by calculating the restoration control current, the damping control current, the inertia control current, and the friction control current.

In the power steering control method, the motor control current for providing a steering assist force may be finally calculated to control the motor, by using the restoration control current, the damping control current, the inertia control current, and the friction control current, which are described above. The motor is controlled depending on a change of the motor control current value and provides a steering assist force according to a driver's steering operation.

The motor of the present invention performs a function of providing the steering assist force. Although the motor is illustrated for the ease of understanding, the present invention is not limited to the position and type of the motor. In addition, it should be understood that various constitutions capable of providing a steering assist force, in addition to the motor, are included.

Figure 6:
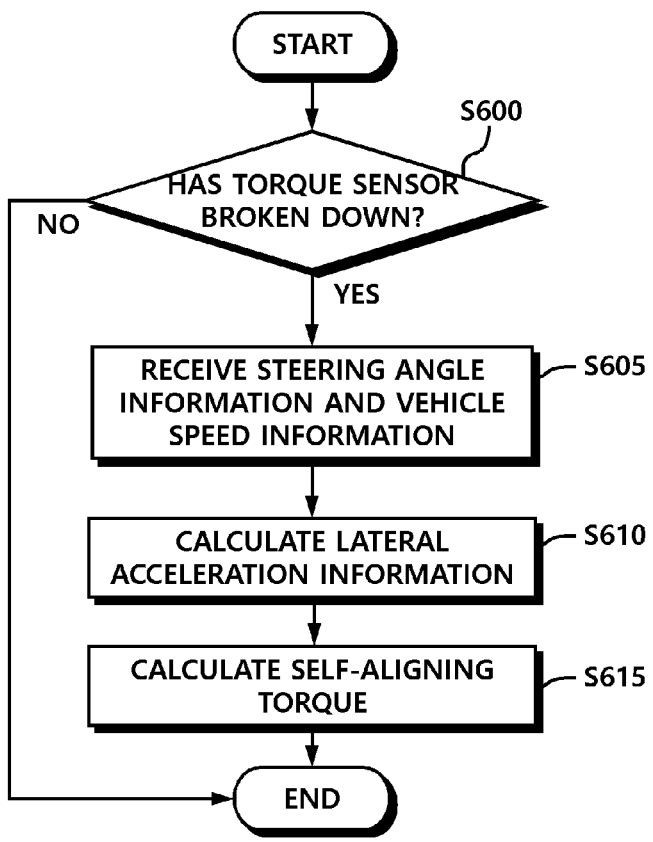
FIG. 6 is a flowchart illustrating an operation of calculating a self-aligning torque in a compensation target value calculation step, according to an embodiment of the present invention.

FIG. 6 is a flowchart illustrating an operation of calculating a self-aligning torque in a compensation target value calculation step, according to an embodiment of the present invention.

The operation of calculating a self-aligning torque in the compensation target value calculation step will be described with reference to FIG. 6. For example, in a power steering control method, whether a torque sensor has broken down may be determined in a breakdown detection step (S600). In cases where the torque sensor has broken down, steering angle information is received from a steering angle sensor or a motor position sensor, and information on the vehicle speed is received from a vehicle speed sensor in an information reception step (S605). As described above, in a compensation target value calculation step, lateral acceleration information may be estimated and calculated based on the steering angle information, the vehicle speed information, and pre-stored vehicle characteristic information (S610). In the compensation target value calculation step, when the lateral acceleration information is calculated, corresponding slip angle information may be estimated, and a self-aligning torque that corresponds to the estimated slip angle information may be calculated (S615).

If it is determined that the torque sensor normally operates, a steering assist force may be calculated based on a torque signal of the torque sensor to supply a motor control current.

In another example, in the compensation target value calculation step, the lateral acceleration information calculated in step S610 may be compared with a sensed value detected by a lateral acceleration sensor, and a self-aligning torque may be calculated according to the comparison result. For example, in the compensation target value calculation step, in cases where the calculated lateral acceleration information is within a preset error range based on the sensed value, slip angle information may be estimated by using the lateral acceleration information in order to calculate a self-aligning torque. In the compensation target value calculation step, in cases where the calculated lateral acceleration information is beyond the error range of the sensed value, error processing may be performed because the lateral acceleration information is not reliable. Alternatively, in cases where the calculated lateral acceleration information is beyond the error range of the sensed value, slip angle information may be estimated by using the sensed value in order to calculate a self-aligning torque. In this way, it is possible to address a problem that lateral acceleration information is differently calculated according to road conditions. That is, a setting value for calculating a self-aligning torque is set based on a preset road, such as an asphalt road, and in cases where the setting value may not be applied due to a change of the road environment, whether the calculated lateral acceleration information is available may be determined through a comparison with the sensed value of a lateral acceleration sensor.

Figure 7:
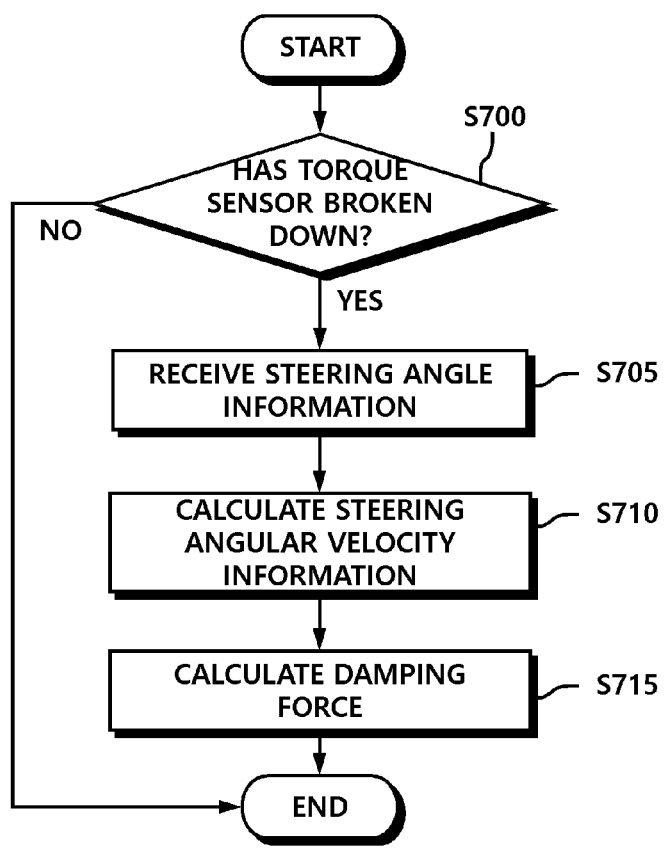
FIG. 7 is a flowchart illustrating an operation of calculating a damping force in a compensation target value calculation step, according to an embodiment of the present invention.

FIG. 7 is a flowchart illustrating an operation of calculating a damping force in a compensation target value calculation step, according to an embodiment of the present invention.

In the compensation target value calculation step, according to the embodiment of the present invention, steering angular velocity information may be calculated by using steering angle information, and a damping force that corresponds to the steering angular velocity information may be calculated.

Referring to FIG. 7, in a power steering control method, whether a torque sensor has broken down may be determined in a breakdown detection step (S700). In cases where the torque sensor has broken down, steering angle information is received from a steering angle sensor or a motor position sensor in an information reception step (S705). In the compensation target value calculation step, steering angular velocity information is calculated by the time derivative of the received steering angle information (S710). A damping force of an electric power steering system corresponds to the steering angular velocity component and may be calculated by using the steering angular velocity information and a preset gain in the compensation target value calculation step. For example, the damping force may be calculated by multiplying the steering angular velocity by the gain.

If it is determined that the torque sensor normally operates, a steering assist force may be calculated based on a torque signal of the torque sensor in order to supply a motor control current.

Figure 8:
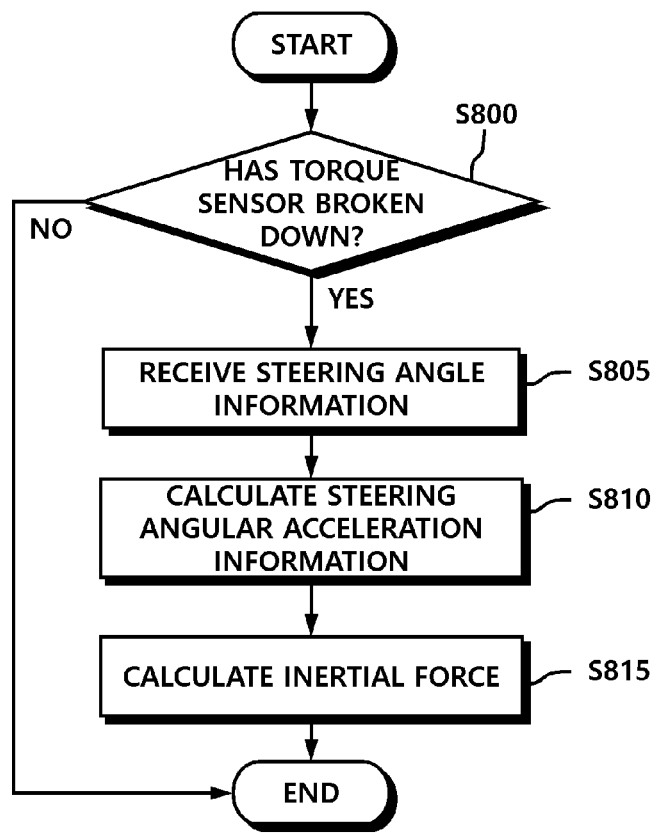
FIG. 8 is a flowchart illustrating an operation of calculating an inertial force in a compensation target value calculation step, according to an embodiment of the present invention.

FIG. 8 is a flowchart illustrating an operation of calculating an inertial force in a compensation target value calculation step, according to an embodiment of the present invention.

In the compensation target value calculation step, according to the embodiment of the present invention, steering angular acceleration information may be calculated by using steering angle information, and an inertial force that corresponds to the steering angular acceleration information may be calculated.

Referring to FIG. 8, in a power steering control method, whether a torque sensor has broken down may be determined in a breakdown detection step (S800). In cases where the torque sensor has broken down, steering angle information is received from a steering angle sensor or a motor position sensor in an information reception step (S805). In the compensation target value calculation step, steering angular acceleration information is calculated by using the received steering angle information (S810). The steering angular acceleration information may be obtained by the time derivative of steering angular velocity information that is calculated by the time derivative of the steering angle information. In the compensation target value calculation step, when the steering angular acceleration information is calculated, an inertial force that corresponds to the steering angular acceleration information may be calculated (S815). The inertial force is dependent on the steering angular acceleration and may be calculated by using a preset gain and the steering angular acceleration. For example, the inertial force may be calculated by multiplying the steering angular acceleration by the gain.

If it is determined that the torque sensor normally operates, the steering assist force may be calculated based on a torque signal of the torque sensor in order to supply a motor control current.

Figure 9:
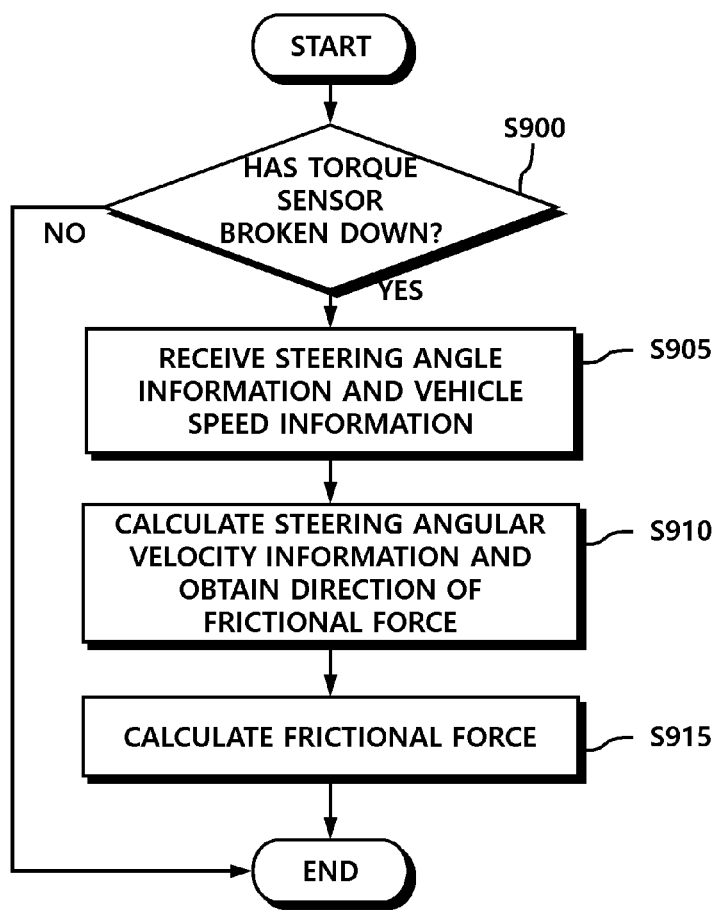
FIG. 9 is a flowchart illustrating an operation of calculating a frictional force in a compensation target value calculation step, according to an embodiment of the present invention.

FIG. 9 is a flowchart illustrating an operation of calculating a frictional force in a compensation target value calculation step, according to an embodiment of the present invention.

In the compensation target value calculation step, according to the embodiment of the present invention, the direction of the frictional force may be obtained based on steering angular velocity information that is calculated by using steering angle information, and a frictional force that corresponds to vehicle speed information may be calculated.

Referring to FIG. 9, in a power steering control method, whether a torque sensor has broken down may be determined in a breakdown detection step (S900). In cases where the torque sensor has broken down, steering angle information is received from a steering angle sensor or a motor position sensor, and information on the vehicle speed is received from a vehicle speed sensor in an information reception step (S905). In the compensation target value calculation step, steering angular velocity information may be calculated from the steering angle information, and since frictional force is generated in an opposite direction to the steering angular velocity, the direction of the frictional force may be obtained (S910). Further, in the compensation target value calculation step, the frictional force, which is generated depending on the vehicle speed information, may be calculated based on the vehicle speed information (S915). Since the frictional force is generated depending on the vehicle speed information, the frictional force may be obtained by multiplying the vehicle speed information by a preset gain. Further, since the frictional force is generated in the opposite direction to the steering angular velocity as described above, all of the direction and the force components of the frictional force may be calculated.

If it is determined that the torque sensor normally operates, a steering assist force may be calculated based on a torque signal of the torque sensor in order to supply a motor control current.

As described above, in the power steering control method, the self-aligning torque, the damping force, the inertial force, and the frictional force, which are force components that have to be calculated in order to provide a steering assist force, can be calculated from the steering angle information and the vehicle speed information even when the torque sensor has broken down, which makes it possible to continually provide the steering assist force. The above-described process of calculating the motor control current for controlling the motor from the self-aligning torque, the damping force, the inertial force, and the frictional force may be performed in the current control step. Alternatively, the respective control currents may be obtained from the self-aligning torque, the damping force, the inertial force, and the frictional force in the compensation target value calculation step, and a motor control current may be calculated by adding the control currents in the current control step. A case where a control current for each component is calculated in a compensation target value calculation step will be described with reference to FIG. 10.

Figure 10:
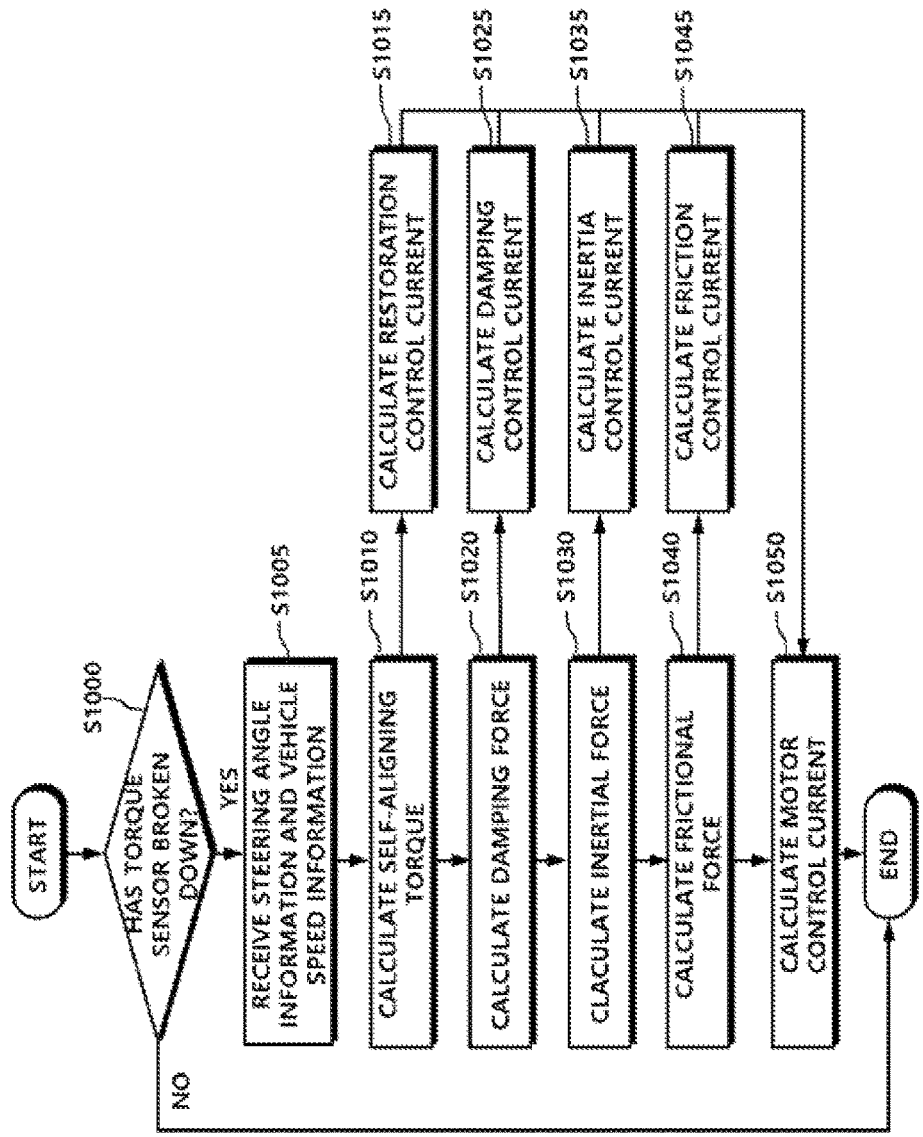
FIG. 10 is a flowchart illustrating an operation of calculating a motor control current in a power steering control method, according to an exemplary embodiment of the present invention.

FIG. 10 is a flowchart illustrating an operation of calculating a motor control current in a power steering control method, according to an exemplary embodiment of the present invention.

The power steering control method, according to the embodiment of the present invention, may include a current control step of calculating the steering assist force based on a compensation target value and controlling the supply of the motor control current that corresponds to the steering assist force. Further, the motor control current of the present invention may be calculated by adding a restoration control current for a self-aligning torque, a damping control current for a damping force, an inertia control current for an inertial force, and a friction control current for a frictional force. As described above, the restoration control current, the damping control current, the inertia control current, and the friction control current may be calculated in the compensation target value calculation step, or may be calculated in the current control step.

Referring to FIG. 10, in the power steering control method, whether a torque sensor has broken down may be determined in a breakdown detection step (S1000). In cases where the torque sensor has broken down, steering angle information is received from a steering angle sensor or a motor position sensor, and information on the vehicle speed is received from a vehicle speed sensor in an information reception step (S1005).

In the power steering control method of the present invention, a compensation target value may be calculated as described above with reference to FIGS. 6 to 9. For example, in the power steering control method, a self-aligning torque may be calculated by using the steering angle information, the vehicle speed information, and vehicle characteristic information (S1010). Further, in the power steering control method, a restoration control current that corresponds to the self-aligning torque is calculated based on the self-aligning torque (S1015). The restoration control current, which is a current value that corresponds to the self-aligning torque, may be calculated by a preset table, etc.

Further, in the power steering control method, a damping force may be calculated by calculating steering angular velocity information by using the steering angle information (S1020). In the power steering method, when the damping force is calculated, a damping control current that corresponds to the relevant damping force is calculated (S1025). The damping control current refers to a current value that is set in advance in order to compensate for the damping force. The damping control current, which is a current value that corresponds to the damping force, may be calculated by a preset table, etc.

Further, in the power steering control method, steering angular acceleration information may be calculated by using the steering angle information, and an inertial force may be calculated based on the steering angular acceleration information (S1030). In the power steering control method, an inertia control current for compensating for the inertial force is calculated based on the calculated inertial force (S1035). The inertia control current, which is a current value that corresponds to the inertial force, may be calculated by a preset table, etc.

Further, in the power steering control method, a frictional force may be calculated by using the steering angle information and the vehicle speed information (S1040). That is, the direction of the frictional force may be calculated by using the steering angular velocity information that is calculated by using the steering angle information, and the magnitude of the frictional force may be calculated by using the vehicle speed information. In the power steering control method, a friction control current for compensating for the frictional force is calculated based on the calculated frictional force (S1045). The friction control current, which is a current value that corresponds to the frictional force, may be calculated by a preset table, etc.

In the power steering control method, a motor may be controlled by using a motor control current. The motor control current may be calculated by using the restoration control current, the damping control current, the inertia control current, and the friction control current, which are described above (S1050). For example, the motor control current may be calculated by adding the restoration control current, the damping control current, the inertia control current, and the friction control current, which are described above. In another example, the motor control current may also be calculated by the sum of values obtained by assigning identical or different weighting values to the restoration control current, the damping control current, the inertia control current, and the friction control current, respectively. In yet another example, the motor control current may also be calculated by using the sum of the self-aligning torque, the damping force, the inertial force, and the frictional force, which are described above, and a table that corresponds to the calculated sum.

The tables for calculating the respective control currents, which are described above, may include values that are stored in advance to correspond to each vehicle's characteristic through experiments, etc.

Meanwhile, in the current control step of the present invention, a steering assist force may be calculated based on a compensation target value, and the supply of the motor control current that corresponds to the steering assist force may be controlled. Further, in the current control step of the present invention, a determination may be made as to whether a vehicle turns, and the supply of the motor control current may be controlled only while the vehicle turns. For example, in the current control step, whether the vehicle turns may be determined. If it is determined that the vehicle turns, a motor may be controlled by using the motor control current calculated by performing the above-described operations of the present invention, and if it is determined that the vehicle does not turn, the steering assist force may not be provided. That is, in cases where there is an abnormality in an electric power steering apparatus while the vehicle turns, a force may be suddenly applied to a driver's steering operation, and if the driver does not properly cope with the situation, the vehicle may move forwards to thereby cause an accident. However, even if the steering assist force is lost while the vehicle is moving forward, a large restoring force is not applied to the driver in order to reduce the risk of an accident. Therefore, the present invention may be applied only to a case where the vehicle turns. Whether the vehicle turns may be determined by using lateral acceleration information of the vehicle. The lateral acceleration information may be estimated as described above, or may be obtained by using a lateral acceleration sensor. Alternatively, whether the vehicle turns may be determined by using tire alignment information of the vehicle, the angle of the steering wheel, or the like. The determination as to whether the vehicle turns is not limited thereto, and may be detected through various other methods.

If the torque sensor breaks down, an alert signal for informing the driver of the breakdown in the torque sensor may be generated in the power steering control method of the present invention. The driver may recognize the corresponding alert signal and may recognize the situation where a steering assist force is being applied through the aforementioned power steering control method. Therefore, the driver can more carefully perform a steering operation while being aware of the breakdown, thereby reducing the risk of an accident.

As described above, the present invention provides the method and apparatus for controlling power steering that can continually provide a steering assist force by using steering angle information and vehicle speed information in the case of a breakdown in a torque sensor.

In addition, the present invention provides the method and apparatus that can calculate a compensation target value required to provide a steering assist force without information from a torque sensor.

Hereinafter, the power steering control device, according to the embodiment of the present invention, which has been described above with reference to FIGS. 1 to 10, will be briefly described once more.

Figure 11:
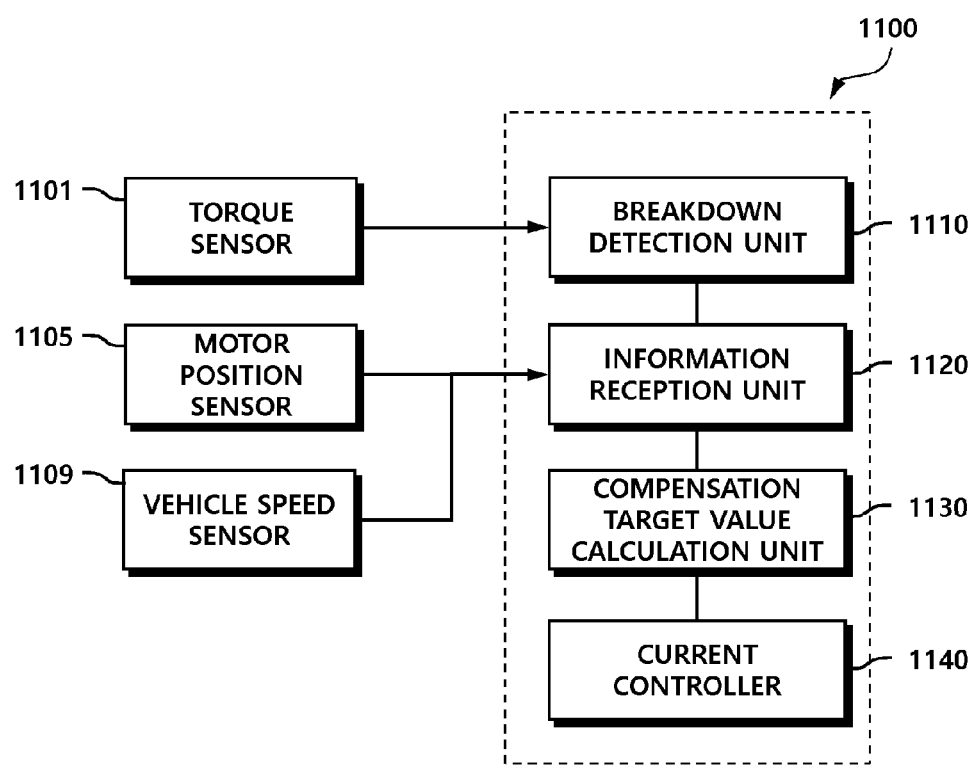
FIG. 11 is a block diagram of a power steering control apparatus according to an embodiment of the present invention.

FIG. 11 is a block diagram of a power steering control apparatus according to an embodiment of the present invention.

The power steering control apparatus 1100, according to the embodiment of the present invention, may include a breakdown detection unit 1110 that detects whether a torque sensor 1101 has broken down; an information reception unit 1120 that receives steering angle information and vehicle speed information in the case in which the torque sensor 1101 has broken down; a compensation target value calculation unit 1130 that calculates a self-aligning torque, and a damping force, an inertial force, and a frictional force of the electric power steering apparatus by using one or more of the steering angle information and the vehicle speed information; and a current controller 1140 that calculates a steering assist force based on a compensation target value and controls the supply of a motor control current that corresponds to the steering assist force.

Referring to FIG. 11, the torque sensor 1101 refers to a sensor that measures the steering torque generated according to a driver's steering wheel operation and generates a steering torque signal. The breakdown detection unit 1110 determines whether the torque sensor 1101 has broken down. Whether the torque sensor 1101 has broken down may be determined through a comparative analysis of one or more torque sensor signals, or may be determined through breakdown identification logic. Alternatively, the breakdown detection unit 1110 may receive a breakdown signal to determine whether the torque sensor 1101 has broken down.

The information reception unit 1120 may receive steering angle information and vehicle speed information when it is determined that the torque sensor 1101 has broken down. For example, when it is determined that the torque sensor 1101 has broken down, the information reception unit 1120 may receive steering angle information from a steering angle sensor or a motor position sensor 1105 and may receive vehicle speed information from a vehicle speed sensor 1109. The steering angle sensor may generate a steering angle signal that contains information on the steering angle of a steering wheel, and the motor position sensor 1105 may calculate and provide the driver's steering angle information by using one or more of an absolute angle and a relative angle of a steering assist motor. The vehicle speed sensor 1109 may calculate and provide the speed information of a vehicle.

The compensation target value calculation unit 1130 may calculate a self-aligning torque, and a damping force, an inertial force, and a frictional force of the electric power steering apparatus by using one or more of the steering angle information and the vehicle speed information. For example, the compensation target value calculation unit 1130 may process the steering angle information and the vehicle speed information to calculate the self-aligning torque, the damping force, the inertial force, and the frictional force, which may be used to calculate the steering assist force required to assist with the driver's steering force. Specific operations in which the compensation target value calculation unit 1130 calculates each compensation target value are the same as those described above with reference to FIGS. 6 to 10.

Further, the compensation target value calculation unit 1130 may calculate a restoration control current that corresponds to the calculated self-aligning torque and a damping control current that corresponds to the damping force. In the same way, the compensation target value calculation unit 1130 may calculate an inertia control current that corresponds to the inertial force and a friction control current that corresponds to the frictional force.

The current controller 1140 may calculate a steering assist force based on a compensation target value and may control the supply of a motor control current that corresponds to the steering assist force. The current control unit 1140 may calculate a motor control current for driving a motor included in an electric power steering system and may supply the motor control current to the motor. Alternatively, the current control unit 1140 may also control to calculate a motor control current and to supply the corresponding motor control current according to the driver's steering wheel operation. The current controller 1140 may determine whether the vehicle turns and may control to supply the steering assist force, according to the aforementioned power steering control method, only when it is determined that the vehicle turns.

In addition, the power steering control apparatus 1100 of the present invention may perform all the power steering control methods described above with reference to FIGS. 1 to 10.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A method for controlling power steering, comprising:
a breakdown detection step of detecting whether a torque sensor has broken down;
an information reception step of receiving steering angle information and vehicle speed information in the case in which the torque sensor has broken down;
a compensation target value calculation step of calculating a self-aligning torque, a damping force, an inertial force, and a frictional force of an electric power steering apparatus by using one or more of the steering angle information and the vehicle speed information; and
a current control step of calculating a steering assist force based on the compensation target value and controlling the supply of a motor control current that corresponds to the steering assist force.

2. The method of claim 1, wherein the steering angle information is received from a steering angle sensor or a motor position sensor.

3. The method of claim 1, wherein the compensation target value calculation step comprises:
calculating lateral acceleration based on the steering angle information, the vehicle speed information, and preset vehicle characteristic information; and calculating the self-aligning torque based on the calculated lateral acceleration information.

4. The method of claim 3, wherein the vehicle characteristic information comprises one or more of vehicle wheelbase information, under steer gradient constant information, information on the acceleration of gravity, and information on the gear ratio between a steering wheel and a tire.

5. The method of claim 3, wherein the compensation target value calculation step further comprises:
identifying slip angle information that corresponds to the lateral acceleration information; and calculating the self-aligning torque that corresponds to the slip angle information.

6. The method of claim 5, wherein the compensation target value calculation step further comprises:
calculating the self-aligning torque only when it is determined that the lateral acceleration information is within a preset linear interval.

7. The method of claim 3, wherein the compensation target value calculation step further comprises:
comparing the calculated lateral acceleration information with a sensed value detected by a lateral acceleration sensor; and calculating the self-aligning torque based on the comparison result.

8. The method of claim 7, wherein the compensation target value calculation step further comprises:
calculating the self-aligning torque based on the lateral acceleration information when the calculated lateral acceleration information is within a preset range based on the sensed value.

9. The method of claim 1, wherein the compensation target value calculation step comprises:
calculating steering angular velocity information by using the steering angle information; and calculating the damping force that corresponds to the steering angular velocity information.

10. The method of claim 1, wherein the compensation target value calculation step comprises:
calculating steering angular acceleration information by using the steering angle information; and calculating the inertial force that corresponds to the steering angular acceleration information.

11. The method of claim 1, wherein the compensation target value calculation step comprises:
obtaining the direction of the frictional force based on steering angular velocity information calculated by using the steering angle information; and calculating the frictional force that corresponds to the vehicle speed information.

12. The method of claim 1, wherein the motor control current is calculated by adding a restoration control current for the self-aligning torque, a damping control current for the damping force, an inertia control current for the inertial force, and a friction control current for the frictional force.

13. The method of claim 1, wherein the current control step comprises:
determining whether a vehicle turns; and controlling the supply of the motor control current only when the vehicle turns.

14. An apparatus for controlling power steering, comprising:
a breakdown detection unit that detects whether a torque sensor has broken down;
an information reception unit that receives steering angle information and vehicle speed information in the case in which the torque sensor has broken down;
a compensation target value calculation unit that calculates a self-aligning torque, a damping force, an inertial force, and a frictional force of an electric power steering apparatus by using one or more of the steering angle information and the vehicle speed information; and
a current controller that calculates a steering assist force based on the compensation target value and controls the supply of a motor control current that corresponds to the steering assist force.

* * * * *